US009910894B2

(12) United States Patent
Hays et al.

(10) Patent No.: US 9,910,894 B2
(45) Date of Patent: Mar. 6, 2018

(54) DATA SCOPE ORIGINATION WITHIN AGGREGATION OPERATIONS

(75) Inventors: Christopher A. Hays, Monroe, WA (US); John H. Vulner, Kirkland, WA (US); Robert M. Bruckner, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 316 days.

(21) Appl. No.: 13/550,365

(22) Filed: Jul. 16, 2012

(65) Prior Publication Data
US 2014/0019437 A1    Jan. 16, 2014

(51) Int. Cl.
*G06F 17/30*    (2006.01)

(52) U.S. Cl.
CPC .. *G06F 17/30489* (2013.01); *G06F 17/30864* (2013.01)

(58) Field of Classification Search
CPC ............. G06F 17/30876; G06F 17/246; G06F 17/2247; H04N 1/32288; G06T 1/005
USPC ....................................................... 707/722
See application file for complete search history.

(56) References Cited

U.S. PATENT DOCUMENTS

| | | | |
|---|---|---|---|
| 7,249,328 B1 * | 7/2007 | Davis | 715/853 |
| 7,437,373 B2 | 10/2008 | Whitehead | |
| 7,707,490 B2 | 4/2010 | Hays et al. | |
| 2001/0056398 A1 * | 12/2001 | Scheirer | 705/38 |
| 2004/0064433 A1 * | 4/2004 | Thier et al. | 707/1 |
| 2004/0083222 A1 | 4/2004 | Pecherer | |
| 2004/0243576 A1 | 12/2004 | Shrivastava et al. | |
| 2006/0107196 A1 | 5/2006 | Thanu et al. | |
| 2007/0094060 A1 * | 4/2007 | Apps | G06F 17/30398 705/7.36 |
| 2007/0226200 A1 | 9/2007 | Hays et al. | |
| 2010/0017395 A1 * | 1/2010 | Wayn | G06F 17/30592 707/E17.014 |
| 2011/0125804 A1 | 5/2011 | Aegerter | |
| 2011/0179051 A1 | 7/2011 | Bruckner et al. | |

(Continued)

OTHER PUBLICATIONS

"Integration", Retrieved at <<http://www.seemoredata.com/products/integration.php>>, 2003-2009, 1 page.

(Continued)

*Primary Examiner* — Mariela Reyes
*Assistant Examiner* — Courtney Harmon
(74) *Attorney, Agent, or Firm* — Lempia Summerfield Katz LLC (57) ABSTRACT

A computer-implemented method for generating a report from a report definition specifying a plurality of data scopes for a dataset includes interpreting, with a processor, a report definition for the report, the report definition comprising a calculation expression for populating a unit of the report, the calculation expression comprising a data aggregation operation, the data aggregation operation comprising an originating reference to a further data scope, accessing a memory coupled to the processor to obtain data from the dataset for respective subsets of the dataset corresponding with the further data scope, determining, with the processor, an output value for the calculation expression in accordance with the obtained data and the data aggregation operation, and rendering the report based on the output value.

20 Claims, 6 Drawing Sheets

(56) References Cited

U.S. PATENT DOCUMENTS

2011/0246447 A1    10/2011   Hays et al.
2011/0320432 A1    12/2011   Dewar et al.

OTHER PUBLICATIONS

"Calculating Totals and Other Aggregates (Reporting Services)", Retrieved at <<http://msdn.microsoft.com/en-us/library/bb630415.aspx>>, Retrieved Date: Jul. 16, 2012, 6 pages.

"Using Built-in Report and Aggregate Functions in Expressions (Reporting Services)", Retrieved at <<http://msdn.microsoft.com/en-us/library/ms159673.aspx>>, Retrieved Date: Jul. 16, 2012, 7 pages.

"Understanding Groups (Report Builder and SSRS", Retrieved at <<http;//msdn.microsoft.com/en-us/library/dd255263.aspx>>, Retrieved Date: Jul. 16, 2012, 5 pages.

"Expression Scope for Totals, Aggregates, and Built-in Collections (Report Builder and SSRS)" Retrieved at <<http://msdn.microsoft.com/en-us/library/dd255256.aspx>>, Retrieved Date: Jul. 16, 2012, 8 pages.

* cited by examiner

|     |        | 2010  |       |        |       | 2011  |       |          |       |
|-----|--------|-------|-------|--------|-------|-------|-------|----------|-------|
|     |        | B&M   |       | Internet |     | B&M   |       | Internet |       |
|     |        | Sales | % Tot | Sales  | % Tot | Sales | % Tot | Sales    | % Tot |
| US  | West   | 100   | 50%   | 100    | 50%   | ...   | ...   | ...      | ...   |
|     | East   | 300   | 75%   | 100    | 25%   | ...   | ...   | ...      | ...   |
|     | Total  | 400   | 66%   | 200    | 33%   | ...   | ...   | ...      | ...   |
| Canada | West | ...   | ...   | ...    | ...   | ...   | ...   | ...      | ...   |
|     | East   | ...   | ...   | ...    | ...   | ...   | ...   | ...      | ...   |
|     | Total  | ...   | ...   | ...    | ...   | ...   | ...   | ...      | ...   |

FIG. 1

|           |          | [Year]         |                |
|-----------|----------|----------------|----------------|
|           |          | [Channel]      |                |
|           |          | Sales          | % Tot          |
| [Country] | [Region] | <Calc1>  | <Calc3>  |
|           | Total    | <Calc2>  | <Calc4>  |

|  | 2010 | | 2011 | |
|---|---|---|---|---|
| | Total Sales | Top Month | Total Sales | Top Month |
| US | 100 | 20 | ... | ... |
| Canada | ... | ... | ... | ... |
| Total | ... | ... | ... | ... |

FIG. 5

|  | [Year] | |
|---|---|---|
| | Total Sales | Top Month |
| [Country] | <Calc1> | <Calc7> |
| Total | <Calc2> | <Calc8> |

DATA SCOPE ORIGINATION WITHIN AGGREGATION OPERATIONS

BACKGROUND OF THE DISCLOSURE

Brief Description of Related Technology

Businesses and other entities use software to generate reports on which decisions are based. To be useful, the reports typically group and aggregate data. For instance, when reporting on sales for a company, a mere list of every transaction does little good when making business decisions. By grouping and aggregating the data into meaningful categories (e.g., total sales broken down by product and region), data is transformed into more useful information.

The data is often grouped via a definition of the report. The report definition sets forth instructions for the layout of the report, the source(s) of the data, and the aggregation operations and other computational processing of the data. The aggregation operations (e.g., a sum operation) may group the data in accordance with a level of detail, or data scope, of the data being aggregated. For example, sales may be aggregated by year, by quarter, by month, by region, by customer, etc., as well as various combinations thereof. Such data scopes may be established implicitly (e.g., by the context or location of the aggregation operation) or explicitly (e.g., by express declaration within the aggregation operation).

SUMMARY OF THE DISCLOSURE

Methods, systems, and computer program products are directed to supporting data scopes originated within data aggregation operations. The data scopes may then be used in the data aggregation operations. The data scopes need not be explicitly created outside of a data aggregation operation for data display in a report.

In accordance with one aspect of the disclosure, a report definition includes a calculation expression for populating a unit of a report. The calculation expression includes a data aggregation operation that, in turn, includes an originating reference to a data scope. With the originating reference, the data scope need not be one of the data scopes defined or introduced elsewhere in the report definition.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWING FIGURES

For a more complete understanding of the disclosure, reference should be made to the following detailed description and accompanying drawing figures, in which like reference numerals identify like elements in the figures.

FIG. 1 is one example of a report or other data display having a number of computations that may be implemented via data scopes originated within aggregation operations in accordance with one embodiment.

FIG. 2 is a schematic representation of a report definition of the report of FIG. 1.

While the disclosed systems and methods are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION

The disclosed methods and systems are directed to identifying or establishing data scopes within instructions that set forth aggregation operations. The data scopes may be introduced via constructs of a report definition language in which the instructions are written or developed. The instructions for an aggregation operation may thus introduce or otherwise originate a data scope over which the aggregation operation is implemented. The aggregation operation may include a reference to the data scope being introduced or originated. Origination of the data scope within the aggregation operation may avoid a separate, express creation of the data scope for the report via other instructions in a report definition. Instantiation, persistence, and other handling of the corresponding groups of data outside of the aggregation operation may thus be avoided. The origination of the data scope may occur in connection with a variety of aggregation operations, including any aggregation calculation or other operation in which a data scope may be specified. In some embodiments, the aggregation operation may originate the data scope by taking a scope function as an argument.

The disclosed methods and systems may allow aggregation operations to reference data scopes not explicitly defined in a report definition for corresponding data presentation in a report. For example, the aggregation operation may include a reference to a data scope that may be inferred from a combination or intersection of other data scopes explicitly defined in the report definition. In other examples, the aggregation operation may include a reference to a data scope that cannot be inferred from the other data scopes in the report definition.

The disclosed methods and systems may be used to facilitate calculations that cross a boundary of a desired data scope for a calculation instruction. For example, a calculation may involve the total sales for a product as a percentage of the total sales for the entire product category. For most such calculations, the calculation instructions may reference a result for an existing data scope, which has been created for displaying such data. In some cases, however, the data scope does not exist to support such calculations. The disclosed methods and systems avoid forcing a report developer to explicitly create the data scope in the report definition. Such express aggregation of the data for the desired data scope may allow the data scope to be referenced later, but involves hiding or discarding the aggregated data corresponding with the data scope because the data is not actually desired in the report. Express aggregation may thus be undesirably inefficient, and may involve instantiation, transmission, and other handling and processing of large amounts of visual data only to discard the data as unneeded.

The disclosed methods and systems may also address cases where expressly declaring the data scope for an aggregation operation is not possible or practicable. Some cases involve the aggregation of data for an intersection or combination of data scopes introduced in the report definition. For example, the desired data scope may be inferable from a number of ancestor or outer data scopes to define groups or subsets of the data along one or more axes of multidimensional data. Other cases arise when the desired group scope cannot be inferred from combinations of data scopes involved in other calculations in the report definition. For example, the desired data scope may be synthesized or originated for the same calculation expression (or data aggregation operation thereof) in which the desired data scope is used. Still other cases may involve intersections or other combinations of data scopes in which one or more of the data scopes is synthesized or originated within the calculation expression or aggregation operation. The origination of a data scope within a calculation expression or aggregation operation may thus involve a multidimensional scope intersection, the synthesis or origination of a single dimensional data scope, or a multidimensional scope intersection involving the synthesis or origination of one or more data scopes.

In some embodiments, the reference to a multidimensional data scope may be embedded or otherwise incorporated in a calculation expression or data aggregation operation or function thereof in which a data scope may be identified. The expression, operation, or function may take the reference to the multidimensional data scope as an argument or parameter. In some embodiments, the reference is configured as a scope function taken as an argument. The scope function may, in turn, take a number of arguments to define the multidimensional data scope. The calculation or aggregation may thus be implemented in the context of, or established by, the resulting multidimensional data scope.

The disclosed methods and systems may provide a number of benefits in the context of business intelligence reports. For instance, the references to data scopes not introduced elsewhere in a report definition may improve the efficiency of a business intelligence system, including, for example, the report generation software implemented therein. The efficiency and other improvements may involve decreases in data transmissions and/or data storage. Alternatively or additionally, the instantiation of large groups of data for display in a report may be minimized or eliminated. In these and other ways, the disclosed methods and systems may improve the performance of business intelligence systems, report generation systems, and/or the processing systems thereof.

Although described in the context of tabular report arrangements, the disclosed methods and systems may be used with a wide variety of report types, formats, and arrangements. For example, the disclosed methods and systems are well-suited for use with reports in which the data is displayed in charts or other non-tabular arrangements. The reports generated by the disclosed methods and systems may include or involve a wide variety of data displays and are not limited to any particular output device or user interface. The disclosed methods and systems are also not limited to any particular type of report definition, report definition language, or report generation software.

The disclosed methods and systems are not limited to a particular type of business intelligence system, and may be used with different types of report development software systems. For example, the disclosed methods and systems are well suited for, but not limited to, use with SQL Server® Reporting Services (SSRS) software commercially available from Microsoft Corporation.

FIG. 1 depicts an exemplary report 100 for which the disclosed systems and methods may be useful. The report 100 has a tabular data display arrangement. Data is arranged in a number of columns 102 and a number of rows 104. Data is aggregated for presentation within cells 106 in accordance with the respective column 102 and the respective row 104. The cells 106 may be organized under multiple levels of detail or data scopes along the columns 102 and/or the rows 104. In this example, the columns 102 include outer columns 108 to group the data by year (e.g., 2010, 2011) and inner columns 110 to group the data by sales channel (e.g., bricks and mortar or B&M, Internet) within each year. The rows 104 include outer rows 112 to group the data by country (e.g., US, Canada) and inner rows to group the data by region (e.g., West, East) within each country.

The data scope establishes or defines subsets or groups of a dataset. For example, the data scope may collect in a respective group all of the sales in the dataset for a particular region or country. As shown in this example, data scopes may establish a hierarchy of such groups. Groups for an outer scope may include any number of groups for inner scopes. Each group for an inner scope is contained within a group for an outer scope. For example, the groups defined via the region scope are contained within respective groups for the country scope. A report definition may thus use outer and inner scopes to define a specific group of data from the dataset (e.g., all data in the dataset associated with a specific month, April, of a given year, 2010). The outer scope may be considered an ancestor or parent scope of the inner scope(s), which may thus be considered a descendant or child scope.

The data scope may determine the subset or group of data to which a function or operation is applied. In the example of FIG. 1, the data scopes are used to define the parameters of several sales computations. For instance, the sales for a given channel, year, region, and country are aggregated, before being aggregated further for each country. In an adjacent column, a computation presents these aggregations as a percentage of total sales, such that a sum for total sales is determined based on the data scope. In this example, the total sales for the percentage calculation are computed either for a given region or a given country, depending on the location of the cell. A variety of aggregation operations, functions, computations, or other elements in a report may use a data scope to identify the subset or group of data to which the operation or other element is applied.

Other exemplary uses of scopes are provided in U.S. Patent Publication No. 2011/0179051 ("Dynamic Expansion of Data Calculation Scopes"), the entire disclosure of which is incorporated by reference.

FIG. 2 depicts a schematic representation of a report definition 120 for the report 100 of FIG. 1. The report definition 120 includes a number of column headers 122 and a number of row headers 124 configured to establish the columns and rows of the report, respectively. The column headers 122 and the row headers 124 may be either static or dynamic. Dynamic headers allow the table to expand through a variable number of columns or rows for a given data scope to accommodate the data provided by the dataset. Static headers do not support expansion, but may be replicated for each column (or set of columns) created in connection with an outer (or parent) dynamic header. In this example, the column headers 122 for the "Sales" and "% Tot" columns are static, while the column headers 122 for the "Year" and "Channel" data scopes are dynamic. The row header 124 for the "Total" row is static, while the row headers 124 for the "Country" and "Region" data scopes are dynamic. The dynamic column and row headers may be distinguished by a declarative marking (e.g., brackets) and a field (e.g., database field) of the dataset associated with the data scope (e.g., "Country"). Further information regarding the declaration of dynamic rows and columns is set forth in U.S. Pat. No. 7,707,490 ("Systems and Methods for Flexible Report Designs Including Table, Matrix, and Hybrid Designs"), the entire disclosure of which is incorporated by reference.

The report definition 120 includes computer-readable instructions configured to implement the computations for each cell of the report. The computer-readable instructions may be set forth in a variety of different languages. For example, the instructions may be set forth in accordance with the Report Definition Language (RDL) standard proposed by Microsoft Corporation, which may then be used with Microsoft® SQL Reporting Services (SSRS) report generation software. The RDL standard is configured as an extensible markup language (XML) scheme. Other XML schema may alternatively or additionally be used. For example, a different XML scheme may be used in conjunction with report generation software applications other than SSRS. The report definition 120 need not use an XML scheme, and instead may be set forth in any report definition or other language.

The instructions include one or more calculation expressions or instruction(s) for populating one or more cells with a value or other data. The calculation expressions or instructions for some of the cells of the report include a data aggregation function or operation, such as a Sum( ) operation that returns a total value for a group of data. Other examples of aggregation operations include a Max( ) operation that returns a maximum value of the data group, a Min( ) operation that returns a minimum value of the data group, and an Avg( ) operation that returns an average value of the data group. Any number of aggregation operations may be available and supported for use in the report definition 120. Additional and alternative operations may be provided.

The group of data to which an aggregation operation is applied is specified via the data scope (e.g., group scope) for the aggregation operation. The aggregation operations are set forth in the report definition 120 in a manner that specifies the data scope. The data scope may be specified via an argument of the aggregation operation. The data scope may be specified explicitly or implicitly. For example, the data scope may be implicitly specified via the context or location of the aggregation operation, or calculation expression, in the report definition 120. The data scope may thus be context- or location-dependent. The location in the report definition, in turn, reflects the location of the cell or other item in the report being populated by the calculation expression. In this example, the calculation expressions abbreviated as <Calc1> and <Calc2> may be identical (e.g., Sum([Sales]). The calculation expressions return different result values because the data scopes are context-dependent. The expression computes for <Calc1> the total sales for each distinct combination of Country, Region, Year, and Channel values. The data scope in each case is an intersection of that distinct combination. In contrast, the expression computes for <Calc2> the total sales for each distinct combination of Country, Year, and Channel values, thereby providing one or more subtotals that aggregate across Regions. The differences in the data scopes are determined by configuring the report definition 120 such that the <Calc1> expression is contained with the Region scope on rows (which, in turn, is contained with the Country scope) and the Channel scope on columns (which, in turn, is contained with the Year scope). The <Calc2> expression is only contained within the Country scope on rows and the Channel scope (and, thus, Year scope) on columns. Further information regarding such implicit scoping is provided in the above-referenced U.S. Pat. No. 7,707,490 ("Systems and Methods for Flexible Report Designs Including Table, Matrix, and Hybrid Designs"). The manner in which a calculation expression or aggregation operation implicitly establishes a data scope may vary. For example, the data scope may be inferred from other information in the report definition 120.

The data scope for a calculation expression may also be explicitly specified by incorporating a parameter or other identifier in the aggregation operation. In some embodiments, the aggregation operation may allow a data scope to be identified as an argument. For example, a calculation expression may include Sum([Sales], "Year"), which compute the total sales for the Year regardless of the context or location of the calculation expression. The manner in which a calculation expression or aggregation operation explicitly or expressly establishes a data scope may also vary.

The above-described implicit and explicit scoping may not be sufficient for all cells or units of a report. Two examples are provided in connection with the example of FIGS. 1 and 2. Neither implicit nor explicit scoping provides the desired results for the calculation expressions abbreviated as <Calc3> and <Calc4>. As shown in FIG. 1, the expression for <Calc3> is intended to compute the percentage contribution of each channel's yearly sales (within the Country and Region) relative to the overall total sales in that year within a given Country and a given Region. However, the overall total sales figures in each year for a Country and Region combination are not provided in the report. Those totals are not computed during execution of the report definition 120. The corresponding groups or subsets of the dataset that lead to such totals are thus not instantiated.

The report definition 120 may be modified to support such calculations. For example, another column may be added to the report to calculate those overall total sales figures. The column may have a row header labeled "Total" and be contained within the Year scope. The calculation expression may then use implicit scoping (e.g., Sum([Sales]) to compute the total sales for each distinct combination of Country, Region, and Year values to be used in denominator of the percentage calculation. However, in some cases, adding a column or other modifications to the report may not be desirable.

Rather than force the report developer to include a separate column to support the <Calc3> percentage computation, the aggregation operation may be configured such that a reference to a further data scope may be incorporated therein. The further data scope need not be specified elsewhere in the report definition 120. In this example, the further data scope corresponds with an intersection set (or combination) of two other data scopes identified in the report definition 120. The further data scope may be specified explicitly by expressly identifying the other data scopes in the reference. The reference may be set forth in-line or be otherwise embedded in the aggregation operation. For example, if the aggregation operation is configured as a function, then the reference may be expressly provided via one or more arguments. In one embodiment, the aggregation operation may take as an argument a function that returns the desired data scope. For example, the aggregation operation for the <Calc3> expression may be set forth as follows: Sum([Sales])/Sum([Sales], Scope("Region","Year")). The denominator, or divisor, in this example, computes the total sales for the explicit intersection of the Region scope and the Year scope. Because the Region scope is contained within the Country scope, the expression establishes that the subtotal calculated is the yearly sales for each country and region.

In this example, the reference to the otherwise un-introduced data scope is provided via a Scope( ) function nested or embedded in the expression of the Sum( ) function. The reference need not be configured as a function. For example, the reference may be set forth in an alternative format in connection with other report definition languages.

The incorporation of the Scope( ) function or other reference originates and establishes the data scope for the aggregation operation into which the function or reference is incorporated. The data scope need not be originated or introduced elsewhere in the report definition 120.

The use of the Scope( ) function explicitly specifies the data scope for the aggregation operation. The above-described implicit scoping may thus be overridden. Further, the data scope is not limited to explicitly identifying a single scope, such as "Year", which would undesirably compute the sales for each entire year (rather than for a specific country and region, as desired). Instead, the Scope( ) function or other reference may establish a multidimensional data scope derived from the combination of two or more data scopes (e.g., "Region" and "Year" in the example of <Calc3>). Origination of the multidimensional scope computes the desired value without resorting to, for instance, the artificial creation of calculations in another column. The report developer thus avoids having to include instructions to hide or discard the column or the underlying aggregated data. Generation of the report may be more efficient, as the steps taken to process and handle such aggregated data for display in the report also become unnecessary.

In the example described above, the Scope( ) function is configured to take two arguments. One argument is the name of a data scope identified elsewhere in the report definition 120 for a row (e.g., a row scope), and the other argument is the name of a scope identified elsewhere in the report definition for a column (e.g., a column scope). The Scope( ) function may then be configured to define the data scope corresponding with the intersection set of the row and column scopes identified as arguments. In other embodiments, the Scope( ) function may be configured to take additional scopes. The intersection may thus be defined along more than two dimensions. Such intersections may be useful with, for instance, other types of reports, such as non-tabular reports. For example, more than two dimensions may be useful in a report arrangement configured with a three-dimensional chart or other graphical representation of data.

With continued reference to FIGS. 1 and 2, the calculation expression for <Calc4> provides another example of a reference to a multidimensional scope. The calculation expression for <Calc4> is intended to compute another percentage computation. In this example, the computation is for the percentage contribution of a specific channel for an entire country in a given year. The denominator, or divisor, of the computation again involves an intersection of a row scope and a column scope not defined or originated elsewhere in the report definition 120. In this example, the row scope is the Country scope (rather than the Region scope as in <Calc3>), and the column scope is again the Year scope. Instead of creating a column to expressly compute a total for the intersection, the calculation expression for <Calc4> may be set forth as follows: Sum([Sales])/Sum([Sales], Scope ("Country","Year")).

The implementation of the calculation expressions <Calc3> and <Calc4> may use calculation trees, nested calculations, and other calculation schemes. The calculation scheme may avoid having to fully actualize one or more intermediate calculations. In contrast, adding a column to the report as described above would involve full actualization of the calculations directed to determining the denominators or divisors. Such full actualization may include instantiation, storage, transmission, and rendering of the underlying data group, the results of the calculation, and/or transmission of the data group and/or results.

Figure 3:
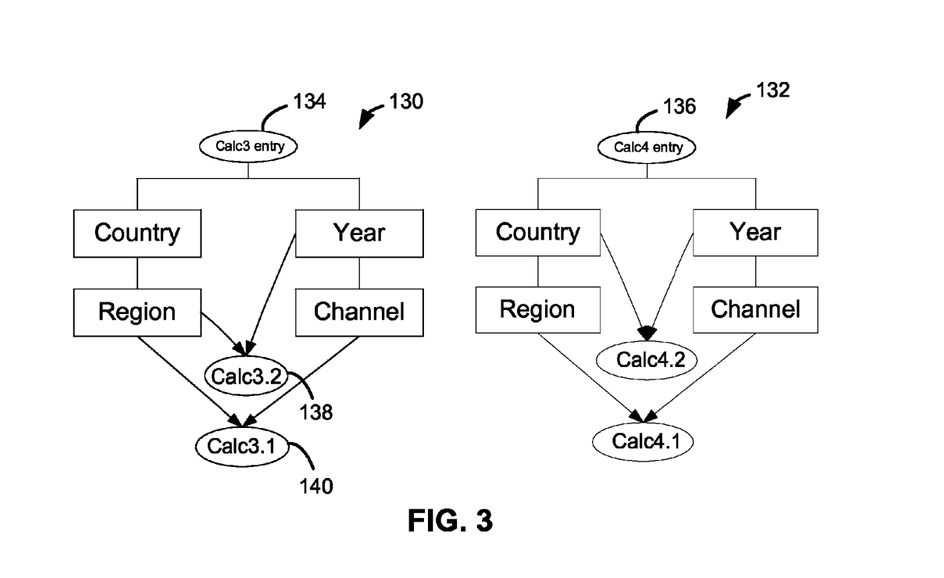
FIG. 3 is a schematic representation of one example of a calculation methodology for implementing the computations for the report of FIG. 1.

FIG. 3 depicts an exemplary calculation methodology or scheme for the multidimensional data scope computations described above. The calculation methodologies may be used by a report generation or business intelligence system to configure database queries and other procedures directed to computing the values involved in the above-described calculation expressions. In this example, the calculation methodology is configured as a pair of calculation trees. A calculation tree 130 is directed to computing the calculation expression <Calc3>, and a calculation tree 132 is directed to computing the calculation expression <Calc4>. Each calculation tree 130, 132 defines a number of data paths emanating from a respective entry point 134, 136. In this example, each calculation tree 130, 132 includes two data paths to accommodate the column and row scopes of the report definition.

The data path for each calculation expression <Calc3>, <Calc4> includes a number of aggregations to support later summations. Each aggregation may include establishing data groups associated with a data scope (e.g., the sales data for each country, for each region thereof, etc.). The above-described multidimensional intersections of the scopes are determined via combinations of two or more data groups. For example, in the <Calc3> calculation, a determination 138, labeled <Calc3.2>, provides the denominator or divisor of each calculation expression <Calc3> via a combination of Region and Year groups. A determination 140, labeled Calc3.1, for the dividend of each calculation expression <Calc3> is determined by a combination of Region and Channel groups. The results of the denominator (divisor) and numerator (dividend) determinations 138, 140 are then used (e.g., <Calc3.1>/<Calc3.2>) to determine outputs for the calculation tree 130 and, thus, the percentage values desired for the report.

The calculation tree 132 for the calculation expression <Calc4> includes a similar framework. The <Calc4> computation is broken down in FIG. 3 as a division operation <Calc4.1>/<Calc4.2>. As in the above-described example for <Calc3>, aggregation or summation of the data groups may proceed via the data paths shown to determine the denominator (divisor) and numerator (dividend) of the division operation. One difference is that the denominator (divisor), <Calc4.2>, involves the data group aggregated at the country level rather than the region level. The computation for Calc4.2 may be attained with the expression: Sum ([Sales], Scope("Country","Year")), as described above. In this example, the computation for Calc4.1 may be attained with the expression Sum([Sales]), determined implicitly in the Country, Year, Channel scope.

Figure 4:
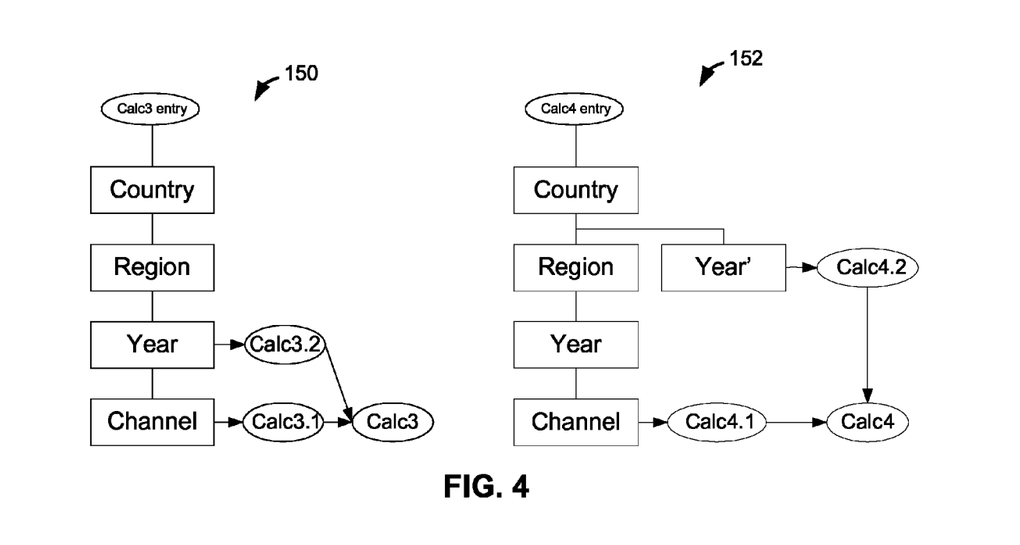
FIG. 4 is a schematic representation of another example of a calculation methodology for implementing the computations for the report of FIG. 1.

FIG. 4 depicts another exemplary calculation methodology or scheme for the multidimensional data scope computations. The above-described calculation trees are flattened into a series of nested calculations, where each level is a nested iterator over instances at that level. For instance, for each country, for each region, for each year, for each channel, compute the calculation expression <Calc3.1>. In this example, a nested series 150 is directed to computing the calculation expression <Calc3>, and a nested series 152 is directed to computing the calculation expression <Calc4>.

In the nested series 150, the iterative computations for the <Calc3.2> calculations provide an output at the Year level to provide a total across all channels. The iterations continue for the <Calc3.1> calculations to provide respective subtotals at the channel scope.

The nested series 152 has a branched structure because a scope specified in the calculation is not aligned with the natural flattening of the corresponding calculation tree. In this example, a set of aggregations or summations labeled Year' is created to accommodate the computation for <Calc4.2>, which only involves the Country and Year scopes, thereby removing the Region scope. The computation methodology or scheme may thus synthesize new branches of a calculation tree or data path to accommodate those calculations which do not exist elsewhere in the report or other data display.

Calculations on parallel branches of the nested series 152 (or other calculation tree) may occur in parallel. Parallel processing may be useful during the computation of the <Calc4> calculation. The parallel processing may help correlate each Calc4.1 value with the appropriate Calc4.2 value, thereby matching each the values for the Year aggregation with those for Year' aggregation. The values may be correlated in a variety of other ways.

Each data aggregation and summation for the Year' portion of the nested series 152 may be discarded after the corresponding output value for the <Calc4> is determined. The data for the Year' portion need not be actualized for, persisted in, or transmitted to, one or more memories associated with, for instance, the rendering of the report. The use of the implicit creation of the computation branch for the Calc4.2 calculation may thus be more efficient than the processing associated with reports in which the results of the Calc4.2 are explicitly made a part of the report.

Figure 5:
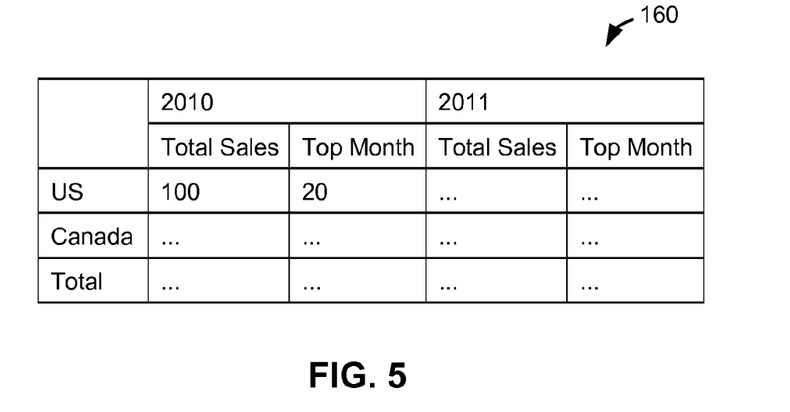
FIG. 5 is another example of a report or other data display having a number of computations that may be implemented via data scopes originated within aggregation operations in accordance with one embodiment.
Figure 6:
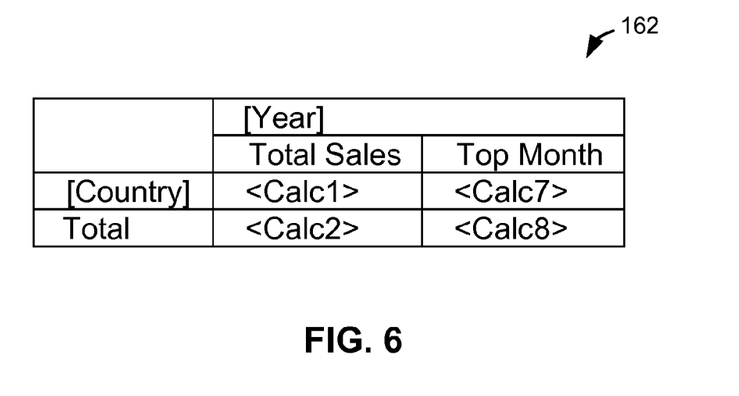
FIG. 6 is a schematic representation of a report definition of the report of FIG. 5.

FIGS. 5 and 6 provide another example in which a data scope is introduced or originated within an aggregation operation. FIG. 5 depicts an exemplary report 160 having a tabular arrangement in which data is aggregated for a column scope for each year and a row scope for each country. The report 160 lacks a column scope to aggregate data for each month and, thus, there is no Month scope to support calculations or determinations at that level of detail.

As described below, an appropriate data scope may be introduced or originated within an aggregation operation for which the data scope is used. In this example, aggregation operations are directed to determining the top month and displaying the total sales in that month. An embedded origination of a data scope at the month level of detail is provided as described below.

FIG. 6 is a schematic view of a report definition 162 for the report 160. In this example, a calculation expression <Calc1> is intended to present the total sales in a country for a given year. A calculation expression <Calc2> is intended to present the total sales in a given year across all countries. The calculation expressions <Calc1> and <Calc2> may be implemented through implicit scoping as described above, in which case each expression may be set forth as Sum ([Sales]). A calculation expression <Calc7> is intended to present the total sales for the month with the highest sales for a given year and country. A calculation expression <Calc8> is intended to present the total sales for the month with the highest sales for a given year across all countries. In both cases, the data scope over which the total is calculated is not present within the report definition 162, so there is no pre-existing data scope to be referenced in the calculation expressions. For the calculation expression <Calc7>, the missing data scope corresponds with an intersection set that would aggregate data at the Country, Year, and Month levels of detail. For the calculation expression <Calc8>, the missing data scope corresponds with an intersection set that would aggregate data at the Year and Month levels of detail.

An aggregation operation may introduce or originate a data scope to provide the missing data scope. As in the embodiment described above, the data scope may be originated for the purpose of supporting the aggregation operation. The data scope may thus be dynamically generated during the implementation of the calculation expression.

The data aggregated in accordance with the data scope need not be retained, transmitted, or otherwise handled outside of the calculation expression. Instantiation, persistence, and transmission, of such data associated with the data scope thus need not occur to support the rendering of the report 160.

If the report definition 162 includes a Month data scope, then the calculation expression <Calc8> may be set forth as Max(Sum([Sales], "Month")) or, equivalently, Max(Sum ([Sales], "Month"), "Year"). In either case, the inner Sum( ) aggregation operation computes the total sales for each instance of the month within a given year. The outer Max( ) aggregation operation then uses the totals to determine the maximum total within each year.

The disclosed methods and systems allow the report developer to avoid having to expressly define and create the Month data scope in the report definition 162 for incorporation into the report 160. Instead, even though the Month data scope does not exist elsewhere in the report definition 162, the calculation expression <Calc8> may be set forth with a defining origination of the Month data scope within the calculation expression. The definition of, and a reference to, the Month data scope may thus be originated or synthesized in-line within the aggregation operation. In this example, the definition of, and reference to, the new data scope are expressed via a CreateScope( ) function. The calculation expression <Calc8> may be set forth as follows:

Max(Sum([Sales], CreateScope("Year",[Month])))

or, alternatively,

Max(Sum([Sales], CreateScope("Year",[Month]), "Year")).

The CreateScope function is configured as a declaration that creates a Month scope as an inner scope, or child (or descendant), of the existing Year scope. The inner Sum aggregation operation then uses the Month scope to compute the total sales for each instance of Month within a given Year.

The nature of the definition and reference to the data scope being originated may vary the examples provided above. The reference need not rely on or include a function-based formulation. For instance, other types of declarations of the data scope may be used. One example representation for <Calc8> may be set forth as follows:

```
<Aggregation Type="Max">
    <Aggregation Field="Sales" Type="Sum"/>
    <Scope Type="Inline">
        <ParentScope>Year</ParentScope>
        <GroupBy Field="Month"/>
    </Scope>
</Aggregation>
```

Data scopes originated in this manner may be referred to herein as synthetic data scopes. However, the origination of the data scope need not involve the synthesis of multiple data scopes. The synthetic data scope may involve creating a data scope without a multidimensional combination, or intersection, of data scopes used elsewhere in the report definition. The aggregation of data to determine a top sales month provides one example of the creation of a non-intersection-based synthetic data scope.

The calculation expression <Calc7> provides an example of an intersection-based synthetic data scope. The calculation expression <Calc7> involves an aggregation of data for each month and for each country. The aggregation operation thus relies on a multidimensional scope. The synthetic data scope is accordingly originated in conjunction with a reference to a multidimensional data scope. The multidimensional data scope reference may use the Scope( ) function described above. The CreateScope( ) and Scope( ) functions may both be incorporated in-line into the aggregation operation as follows:

Max(Sum([Sales], Scope("Country",CreateScope ("Year",[Month]))))

In this example, the CreateScope( ) function is nested within the Scope( ) function, thereby allowing the Month data scope to be created or synthesized as a part of the reference to the multidimensional data scope to be used by the Max( ) aggregation operation. As before, the CreateScope( ) function creates a synthetic or original Month scope as a child of the existing Year scope. The Scope( ) function then creates a multidimensional scope with Country on one axis and the newly created Month scope on the other axis.

In an alternative embodiment, the calculation expression <Calc7> may be set forth with an explicit data scope for the Max( ) aggregation operation. The Scope( ) function or other declaration may be used to provide the explicit data scope. The multidimensional aspect of the data scope may then be introduced within the declaration of the explicit data scope as follows:

Max(Sum([Sales],Scope("Country",CreateScope("Year", [Month]))),Scope("Country","Year")). The synthetic and multidimensional scopes may thus be simultaneously used in a variety of contexts.

Figure 7:
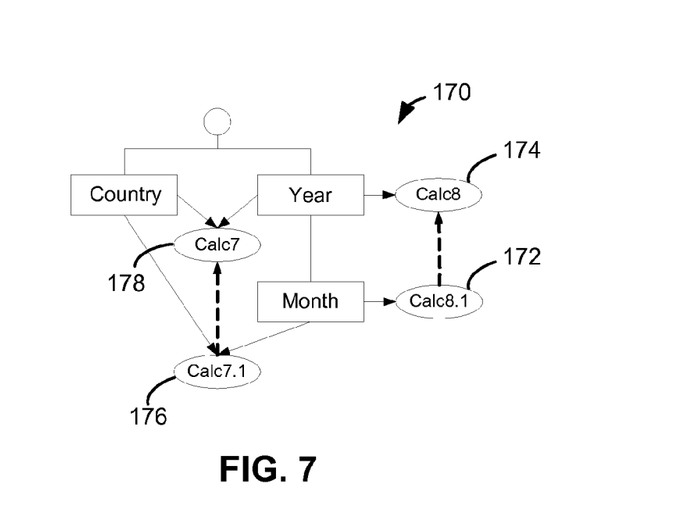
FIG. 7 is a schematic representation of one example of a calculation methodology for implementing the computations for the report of FIG. 5.

FIG. 7 depicts an exemplary computation methodology or scheme for implementing the calculation expressions <Calc7> and <Calc8> via the origination of the Month data scope within the Max( ) aggregation operation. Computations involving synthetic or original scopes may proceed as described above in connection with implicit multidimensional scopes, with a difference being the source of the grouping instructions. In the case of implicit multidimensional scopes, the grouping instructions are obtained from the original data scopes introduced elsewhere in the report definition. In the case of synthetic scopes, the grouping instructions may be explicitly defined in the computations for the calculation expression in which the synthetic data scope is introduced or otherwise originated.

The computation methodology may be configured as a calculation tree 170 in which a Calc8.1 operation 172 corresponds with the inner Sum( ) aggregation operation of the <Calc8> calculation expression, which is calculated at or over the synthetic Month scope. The resulting data is then re-aggregated via the Max( ) aggregation operation in a Calc8 operation 174. A Calc7.1 operation 176 corresponds with the inner sum of the <Calc7> calculation expression, which is calculated at or over the multidimensional scope obtained from the intersection set of the Country and Month scopes. The resulting data is then re-aggregated via the Max( ) aggregation operation in a Calc7 operation 178.

An alternative computation methodology for the calculation expressions <Calc7> and <Calc8> may involve flattening of the calculation tree 170. Such flattening may proceed in a manner similar to the flattening of the calculation trees described above.

Figure 8:
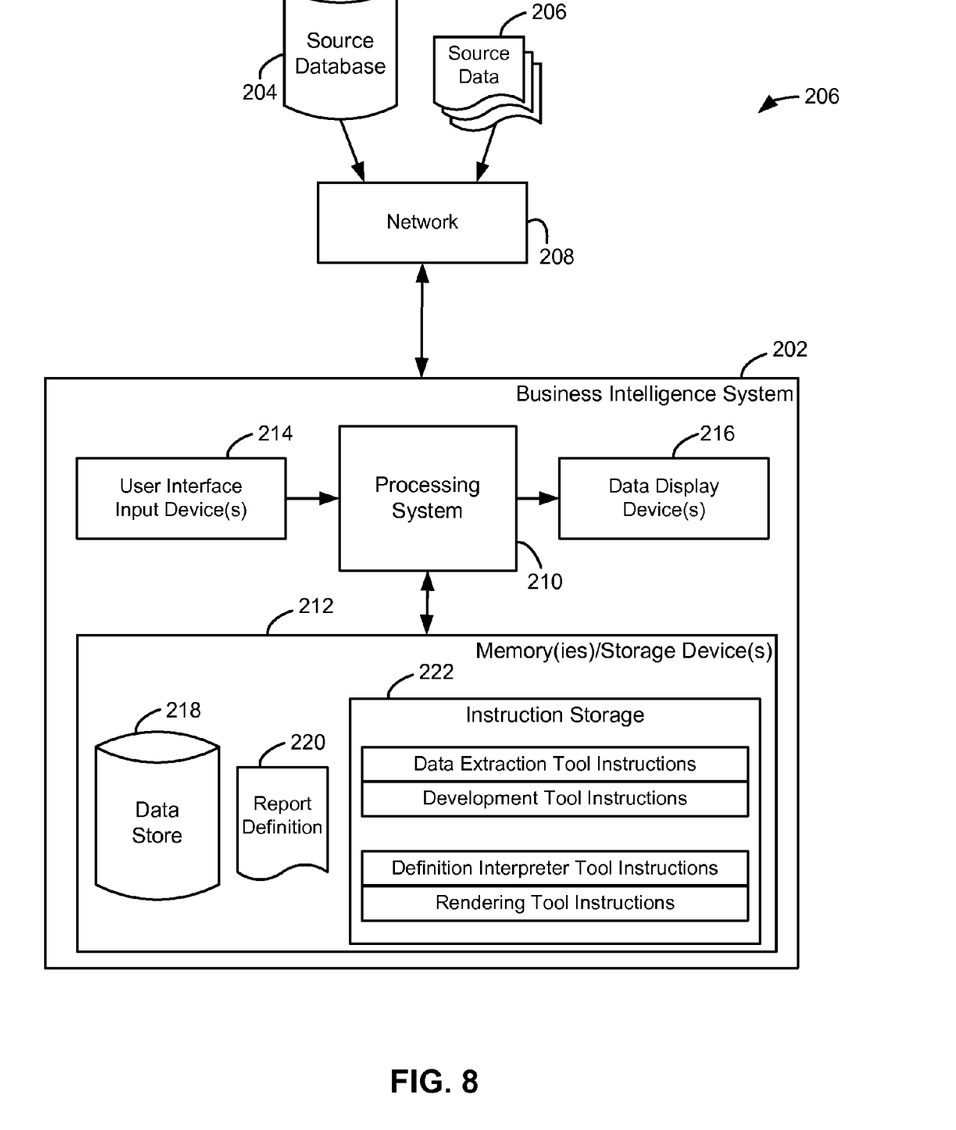
FIG. 8 is a block diagram of an exemplary business intelligence system configured to develop and render reports and other data displays in which data scopes are originated within aggregation operations in accordance with one embodiment.

FIG. 8 depicts an exemplary system architecture 200 in which report definitions are developed and in which reports are rendered from the report definitions. The system architecture 200 may include a system 202, such as a business intelligence system. The system 202 is configured to accommodate report definitions having one or more originating references to data scopes as described above. The system 202 or a subsystem or component thereof may be directed to or configured for report definition development, interpreting report definitions, rendering of reports, or any combination thereof.

The reports developed or generated by the system 202 are configured to present data from a dataset. The dataset may have any number of data sources. In this example, the system 202 obtains source data from a source database 204 and a number of source data files 206. The system 202 may obtain the source data via one or more networks 208, such as the Internet, one or more extranets, a local area network (LAN), or various combinations thereof. The nature, number, format, layout, configuration, connectivity, and other characteristics of the source database 204 (or databases) and the source data files 206 may vary.

The system 202 may include a processing system 210, a memory 212, user interface input devices 214, and a data display device 216 or other output user interface. A variety of operators or other users may use the user interface input devices 214 and other components of the system 202. For instance, report developers or designers may use the system 202 to develop report definitions for reports and otherwise configure an end-user environment of the system 202. The system 202 may include any number of additional computers, devices, or other systems to generate various user interfaces or environments, including, for instance, one or more development environments, one or more end-user environments, an administrative user environment, etc.

The memory 212 may include any number of storage devices of varying types or other data stores or memories. In this example, the memory 212 includes one or more data stores 218 in which some or all of the dataset is stored after the data is extracted or otherwise obtained from the data sources, one or more data files 220 in which the report definition is stored, and one or more memories or data stores 222 in which computer-readable instructions are stored for the processing system 210. For example, the computer-readable instructions may include data extraction tool instructions, report development tool instructions, definition interpreter tool instructions, and rendering tool instructions. Additional, fewer, or alternative instructions or instruction sets may be stored in the memory 212. For example, the memory 212 may include one or more additional data stores in which data is stored during or after various operations, including, for instance, aggregation operations and other operations in which subsets or groups of data are stored. Data for such subsets or groups may be persisted in the additional data stores so that the data need not be re-extracted or re-aggregated from source data.

The processing system 210 may include any number of processors coupled to the memory 212. The processors may be distributed among any number of computing devices, including, for instance, one or more server devices and one or more client devices. The processing system 210 may be configured to execute the data extraction tool instructions to obtain or receive or request data from the data sources, such as the source database 204 and the source data files 206. The data extraction tool instructions may configure the processing system 210 to store the extracted data in the data store 218. Data extraction may also include various processing of the extracted data in preparation for use in connection with the report definition. The processing system 210 is configured to execute the development tool instructions to incorporate, into the report definition 220, a number of instructions for the layout, data, and other aspects of the report. The development tools may be graphical or textual, and may involve any type of user interface. The development tool instructions may be implemented during a report development phase or stage of system operation in which a report designer or developer uses the system 202 to create the report definition. The instructions in the report definition include a number of calculation instructions or other expressions to populate the report with data aggregated from the dataset. The instructions or expressions introduce and/or define a number of data scopes for the dataset. Each data scope may specify a data field of the dataset to define respective subsets or groups of the dataset based on the data field. Various functions or other operations may then be performed over such subsets or groups to aggregate and process the data from the dataset.

As described above, each data scope specifies one or more data fields of the dataset to define a respective subset of the dataset. The processing system 210 (or one or more processors thereof) is further configured to incorporate, into the report definition, a calculation instruction or other expression for populating a unit or portion of the report. For example, the unit may correspond with a cell of a table or matrix, or an element of a chart. The calculation expression sets forth, specifies, references, or otherwise includes a data aggregation function or other operation, such as a summing operation or an averaging operation. As described above, the data aggregation operation includes an originating reference to a further data scope.

Once the report definition is developed, the processing system 210 (or one or more processors thereof) may be configured to interpret the report definition in preparation for report generation or rendering. In this example, report interpretation may be implemented in accordance with the interpreter tool instructions stored in the memory 212. Report interpretation may include parsing the report definition into objects representative of the operations, functions, data scopes, and other elements specified via the report definition. Report interpretation may further include the processing of such objects to utilize or generate calculation trees and/or computation methodologies to support the calculation expressions and other data processing tasks implicated by the report definition.

Such processing of the report definition may include the configuration of the one or more data aggregation operations in the report definition in accordance with originating data scope references embedded therein. An originating data scope reference may be configured as a function embedded in a data aggregation operation and configured to create or otherwise specify a data scope for the operation. For example, the interpreter tool instructions may be configured to allow the originating data scope reference to override an implicit data scope for a data aggregation operation. As described above, such implicit data scopes may be inferred from a location of the calculation expression (or data aggregation operation) in the report definition. Alternatively or additionally, the interpreter tool instructions may be configured to recognize that the originating data scope reference is identifying an intersection set of a number of the data scopes specified in the report definition and/or a data scope not inferable from such intersections or combinations of the other data scopes in the report definition.

The processing system 202 (or one or more processors thereof) may use the results of the interpretation and other processing of the report definition to render or generate the report. For example, the report may be rendered on the data display device 216. The processing system 202 may be configured with the rendering tool instructions to implement one or more procedures involving the processing of the data subsets or groups of the dataset as specified by the data scopes.

The report may be rendered via any display or output device in communication with the processing system 210. The report may include or be configured in a table, matrix, chart, any hybrid or other combination thereof. Other report configurations or arrangements may be provided. The use or incorporation of originating data scope references as described herein is not limited to any particular format or layout, and may be used in connection with any type of reports, either existing or future developed. The characteristics of the report generated by the system 202 may vary accordingly. A report definition may include data or other information regarding the one or more sources of data from which data is obtained and/or processed to populate the report, including information regarding the nature, structure, or other characteristics of such data. A report definition may include layout or formatting information to specify how the data is presented in the report. A report definition may include any number of parameters, properties, or other attributes to specify other characteristics of the report.

Figure 9:
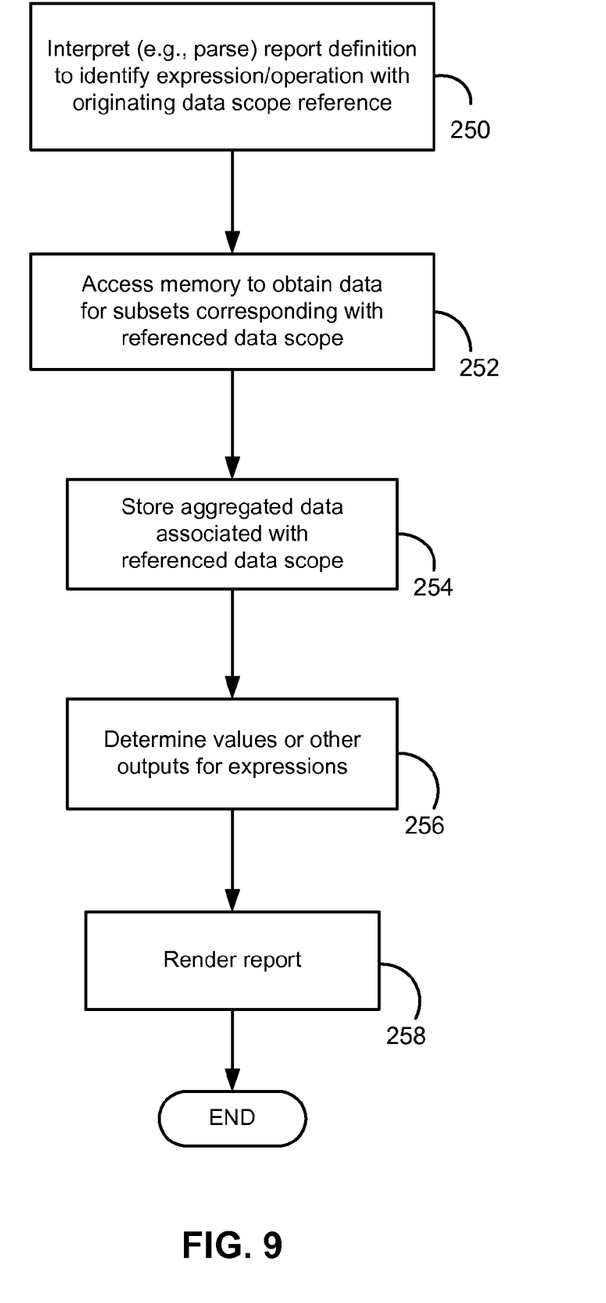
FIG. 9 is a flow diagram of an exemplary computer-implemented method to generate a report from a report definition in which data scopes are originated within aggregation operations in accordance with one embodiment.

FIG. 9 depicts an exemplary method for generating a report from a report definition, the report definition specifying a plurality of data scopes for a dataset. The method is computer-implemented. For example, the processing system 210 (or any one or more processors thereof) shown in FIG. 8 may be configured to implement one or more of the acts of the method. The implementation of each act may be directed by respective computer-readable instructions executed by the processing system 210 (or any one or more processors thereof) or another processing system.

The method may begin with any number of acts directed to the development of the report definition, as described above. The report definition includes at least one calculation instruction or other expression for populating a cell or other unit of the report with the results of a data aggregation function or other operation. The data aggregation operation includes an originating reference to a data scope as described above. The referenced data scope may not be otherwise referenced in the report definition and, thus, need not involve the preparation of data for display in the report.

The method may begin with an act 250 in which the report definition is interpreted. The interpretation may include parsing and other processing of the instructions and other expressions in the report definition. Such interpretation may be implemented using any one or more of the processing systems or processors referenced herein. The parsing and other interpretation may analyze the calculation expressions in the report definition to identify each instance of the various aggregation functions or operations and other objects specified therein, including those instances having an originating data scope reference. Explicit and implicit data scopes for the aggregation operations may be identified. The originating references may be declared or incorporated in a manner other than as an embedded function. The parsing and other interpretation of the report definition may vary based on the format, language, and other characteristics of the report definition.

The interpretation may include recognizing that one or more calculation expressions include an instance of a data aggregation operation with an embedded function configured to originate a further data scope. The further data scope may not be specified or defined in the report definition outside of the calculation expression. As described above, the embedded function or other originating reference may override an implicit data scope for the data aggregation operation inferred from a location of the calculation expression in the report definition. The embedded function may be the above-described Scope( ) function, the above-described CreateScope( ) function, or a nested or other combination thereof. Recognition of the embedded function may then prepare for implementation of the embedded function, including the expectation of the function returning the further data scope as an argument for the data aggregation operation. With the further data scope identified, the interpretation may also include determining the respective subset(s) of the dataset to which the data aggregation operation is to be applied.

As described above, the embedded function or other originating reference may identify an intersection set of a number of data scopes specified in the report definition. Each argument of the embedded function may be recognized to correspond with a respective data scope of the plurality of data scopes specified in the report definition. Multidimensional data scopes may thus be created from the intersections of such scopes. In other cases, the further data scope is not inferable from a combination of the other data scopes in the report definition, in which case a CreateScope( ) function may be used. For example, the function may be recognized as having first and second arguments, the first argument specifying one of the plurality of data scopes as an outer data scope for the further data scope, and the second argument specifying a data field of the dataset to define respective subsets or groups of the dataset based on the data field, respectively. In such cases, the further data scope may nonetheless involve an intersection set between at least one scope not inferable from the plurality of data scopes.

In act 252, one or more memories or data stores are accessed to obtain data to be processed in accordance with the calculation expressions and aggregation operations. The data is stored as a dataset in a centralized, distributed, or other manner. The memory(ies) or data store(s) may be coupled to the processor or processing system. Data is obtained from the dataset for respective subsets of the dataset corresponding with the data scopes referenced in the report definition, including those introduced by originating references.

Some or all of the respective subsets of the dataset for the data scopes may be stored in an act 254. The subsets may be stored in an aggregated format in accordance with the data scopes. In one example, the manner in which the subsets are stored depends upon whether the report definition calls for such subsets to be instantiated and/or persisted for rendering in the report. For instance, subsets only used in connection with aggregation operations based on originating data scope references may only be stored in temporary files or other containers quickly accessible by the processor or processing system. In contrast, data subsets or groups to be rendered may be stored in more permanent files or containers and/or locations more appropriate for access during rendering of the report.

In act 256, the interpreted report definition may be processed to determine output values or other outputs of the instructions, calculation instructions or expressions, and aggregation operations thereof. In some calculations and operations, the output determination may be implemented as part of the act 254. For example, the data subset(s) for a Sum( ) function may be stored as an aggregated total before an output determination is made in connection with a calculation tree or other set of computations.

The output values may then be used to populate the cells or other units of the report in accordance with the formatting and other instructions in the report definition. The population of the report may be integrated with a number of processes directed to generating or rendering the report in an act 258. The nature of the rendering act may vary according to the nature of the report.

The source data may be stored in, for instance, any combination of one or more Extensible Markup Language (XML) files, flat files, databases, blobs in the cloud (e.g., elastic blobs), and various types of data tables.

The data aggregation operation may be configured as any summarizing function or operation. The nature of the summarizing function and/or the data aggregation operation may vary. The data aggregation operation may be configured to summarize or otherwise act on the data within the group specified via the scope.

Figure 10:
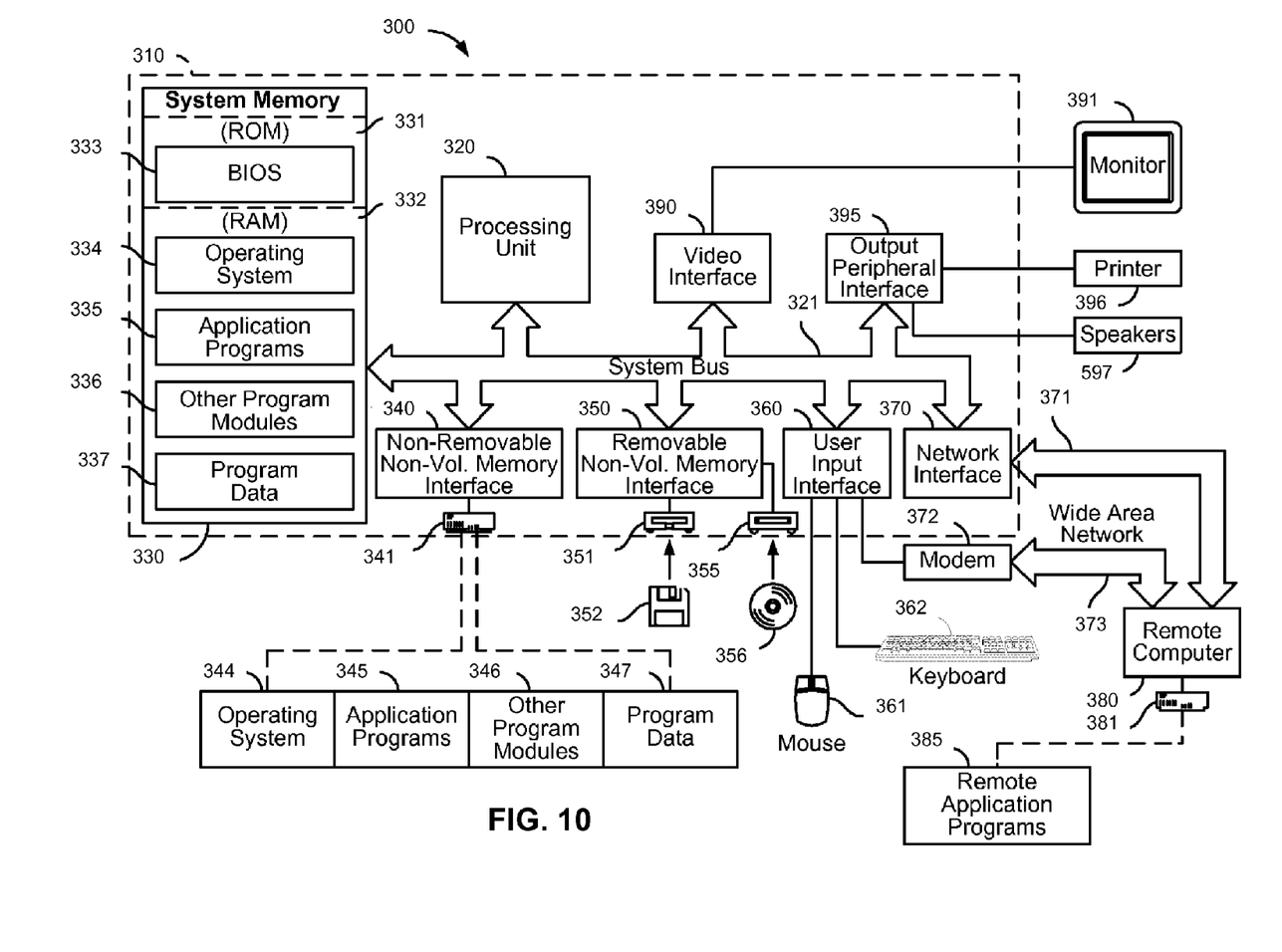
FIG. 10 is a block diagram of a computing environment in accordance with one embodiment for implementation of one or more of the disclosed methods and systems.

With reference to FIG. 10, an exemplary computing environment 300 may be used to implement one or more aspects or elements of the above-described methods and/or systems. For example, the computing environment 300 of FIG. 10 may be used by, or incorporated into, one or more elements of the system 202 (FIG. 8). The computing environment of FIG. 10 may be used or included as a client, network server, application server, or database management system or other data store manager, of any of the aforementioned elements or system components. The computing environment 300 of FIG. 10 may be used to implement one or more of the acts described in connection with FIG. 9.

The computing environment 300 includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The units, components, and other hardware of computer 310 may vary from the example shown.

Computer 310 typically includes a variety of computer readable storage media configured to store instructions and other data. Such computer readable storage media may be any available media that may be accessed by computer 310 and includes both volatile and nonvolatile media, removable and non-removable media. By way of example, and not limitation, such computer readable storage media may include computer storage media as distinguished from communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by computer 310.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 10 illustrates operating system 334, application programs 335, other program modules 336, and program data 337. For example, one or more of the application programs 335 may be directed to implementing the development tool instructions (FIG. 8). Alternatively or additionally, the interpreter tool instructions (FIG. 8) may be implemented via one or more of the other program modules 336. In this or another example, any one or more the instruction sets in the memories or data stores 222 (FIG. 8) may be stored as program data 337.

Any one or more of the operating system 334, the application programs 335, the other program modules 336, and the program data 337 may be stored on, and implemented via, a system on a chip (SOC). Any of the above-described modules may be implemented via one or more SOC devices. The extent to which the above-described modules are integrated in a SOC or other device may vary.

The computer 310 may also include other removable/non-removable, volatile/nonvolatile computer storage media. By way of example only, FIG. 10 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 10, provide storage of computer readable instructions, data structures, program modules and other data for the computer 310. In FIG. 10, for example, hard disk drive 341 is illustrated as storing operating system 344, application programs 345, other program modules 346, and program data 347. These components may either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as a keyboard 362 and pointing device 361, commonly referred to as a mouse, trackball or touch pad. Other input devices (not shown) may include a microphone (e.g., for voice control), touchscreen (e.g., for touch-based gestures and other movements), ranger sensor or other camera (e.g., for gestures and other movements), joystick, game pad, satellite dish, and scanner. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 10. The logical connections depicted in FIG. 10 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 10 illustrates remote application programs 385 as residing on memory device 381. It will be appreciated that the network connections shown are exemplary and other means of establishing a communications link between the computers may be used.

The computing environment 300 of FIG. 10 is only one example of a suitable computing environment and is not intended to suggest any limitation as to the scope of use or functionality of the technology herein. Neither should the computing environment 300 be interpreted as having any dependency or requirement relating to any one or combination of components illustrated in the exemplary operating environment 300.

The technology described herein is operational with numerous other general purpose or special purpose computing system environments or configurations. Examples of well-known computing systems, environments, and/or configurations that may be suitable for use with the technology herein include, but are not limited to, personal computers, server computers (including server-client architectures), hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

This disclosed methods, systems, and computer program products support the development of reports in which, for example, (1) a calculation includes references to a number of implicit ancestor (or outer) group scopes to originate a group scope along one or more multidimensional data axes, (2) synthetic group scopes are defined within calculations which use the synthetic group scope, and (3) multidimensional synthetic group scopes are defined, both with and without non-synthetic scopes along one or more axes.

The disclosed methods and systems may utilize or support data display language constructs by which a data display author incorporate or originate data scopes in an efficient manner as described above. The disclosed methods and systems may be configured to interpret the constructs to translate the constructs and any related instructions into computer-executable instructions to implement various underlying calculations.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A computer-implemented method for generating a report from a report definition, the report definition comprising computer-readable instructions, the computer-readable instructions specifying a plurality of data scopes for a dataset, the method comprising:

interpreting, with a processor, the computer-readable instructions of the report definition for the report, the computer-readable instructions of the report definition comprising a calculation expression for populating a unit of the report, the calculation expression specifying a data aggregation operation, the data aggregation operation comprising an originating reference to a further data scope, the further data scope being synthesized in-line within the data aggregation operation, the data aggregation operation comprising an embedded function to create the further data scope, the embedded function being specified as an argument of the data aggregation operation;

accessing a memory coupled to the processor to obtain data from the dataset for respective subsets of the dataset corresponding with the further data scope;

determining, with the processor, an output value for the calculation expression in accordance with the obtained data and the data aggregation operation; and rendering the report based on the output value;

wherein the further data scope is neither specified nor created in the report definition outside of the data aggregation operation.

2. The computer-implemented method of claim 1, wherein the originating reference overrides an implicit data scope for the data aggregation operation inferred from a location of the calculation expression in the report definition.

3. The computer-implemented method of claim 1, wherein the originating reference identifies an intersection set of a number of the plurality of data scopes specified in the report definition.

4. The computer-implemented method of claim 1, wherein the further data scope is not inferable from a combination of a number of the plurality of data scopes in the report definition.

5. The computer-implemented method of claim 4, wherein the further data scope corresponds with an intersection set involving at least one scope not inferable from the plurality of data scopes.

6. The computer-implemented method of claim 1, wherein the originating reference is configured as a function embedded in the data aggregation operation and configured to specify the further data scope.

7. The computer-implemented method of claim 6, wherein each argument of the function corresponds with a respective data scope of the plurality of data scopes specified in the report definition.

8. The computer-implemented method of claim 7, wherein the function is configured to define the further data scope based on an intersection set of the data scopes specified in the arguments.

9. The computer-implemented method of claim 6, wherein the function is configured with first and second arguments, the first argument specifying one of the plurality of data scopes as an outer data scope for the further data scope, and the second argument specifying a data field of the dataset to define respective subsets of the dataset based on the data field, respectively.

10. The computer-implemented method of claim 1, wherein the further data scope is not specified in the report definition outside of the calculation expression.

11. The computer-implemented method of claim 1, wherein each data scope of the plurality of data scopes specifies a data field of the dataset to define respective subsets of the dataset based on the data field.

12. A system for developing a report definition for a report for presentation of data from a dataset, the system comprising:

a memory in which development tool instructions and interpreter tool instructions are stored;

a processor coupled to the memory configured to execute the development tool instructions to:
incorporate, into the report definition, first computer-readable instructions comprising references to a plurality of data scopes for the dataset, each data scope specifying one or more data fields of the dataset to define a respective subset of the dataset; and
incorporate, into the report definition, second computer-readable instructions comprising a calculation expression for populating a unit of the report, the calculation expression specifying a data aggregation operation, the data aggregation operation comprising an embedded function to create a further data scope, the embedded function being specified as an argument of the data aggregation operation;

wherein the processor is further configured to execute the interpreter tool instructions to configure the data aggregation operation in accordance with the further data scope, and wherein the further data scope is neither specified nor created in the report definition outside of the data aggregation operation.

13. The system of claim 12, wherein the embedded function overrides an implicit data scope for the data aggregation operation inferred from a location of the calculation expression in the report definition.

14. The system of claim 12, wherein the embedded function identifies an intersection set of a number of the plurality of data scopes specified in the report definition.

15. The system of claim 12, wherein the further data scope is not inferable from a combination of a number of the plurality of data scopes in the report definition.

16. A computer program product comprising one or more computer-readable storage memories in which computer-readable instructions are stored that, when executed by a processing system, direct the processing system to:
parse a report definition for a report to identify a calculation expression for populating a unit of the report, the calculation expression specifying an instance of a data aggregation operation, the report definition comprising computer-readable instructions, the computer-readable instructions comprising the calculation expression and specifying a plurality of data scopes for a dataset, each data scope specifying one or more data fields of the dataset to define respective subsets of the dataset based on the data field;

determine an output of the calculation expression in accordance with the data aggregation operation; and render the report with the determined output;

wherein the instance of the data aggregation operation comprises an embedded function configured to create a further data scope, the embedded function being specified as an argument of the data aggregation operation, wherein the calculation expression is configured such that implementation of the embedded function returns the further data scope as the argument for the data aggregation operation to determine a further respective subset of the dataset to which the data aggregation operation is applied, and wherein the further data scope is neither specified nor created in the report definition outside of the data aggregation operation.

17. The computer program product of claim 16, wherein the embedded function overrides an implicit data scope for the data aggregation operation inferred from a location of the calculation expression in the report definition.

18. The computer program product of claim 16, wherein the embedded function identifies an intersection set of a number of the plurality of data scopes specified in the report definition.

19. The computer program product of claim 16, wherein the further data scope is not inferable from a combination of a number of the plurality of data scopes in the report definition.

20. The system of claim 12, wherein the further data scope is synthesized in-line within the data aggregation operation.

* * * * *